United States Patent
Lai

(10) Patent No.: US 10,210,355 B1
(45) Date of Patent: Feb. 19, 2019

(54) COMBINATION OF RFID ANTENNA AND ILLUMINATION DEVICE

(71) Applicant: Chung-Ping Lai, Hsinchu County (TW)

(72) Inventor: Chung-Ping Lai, Hsinchu County (TW)

( * ) Notice: Subject to any disclaimer, the term of this patent is extended or adjusted under 35 U.S.C. 154(b) by 0 days.

(21) Appl. No.: 15/678,275

(22) Filed: Aug. 16, 2017

(51) Int. Cl.
| | |
|---|---|
| *G06K 7/10* | (2006.01) |
| *H01F 38/14* | (2006.01) |
| *H01Q 1/38* | (2006.01) |
| *H01Q 1/06* | (2006.01) |
| *H04N 5/232* | (2006.01) |
| *G08B 13/24* | (2006.01) |
| *H04W 84/12* | (2009.01) |

(52) U.S. Cl.
CPC ...... *G06K 7/10118* (2013.01); *G06K 7/10425* (2013.01); *G08B 13/248* (2013.01); *G08B 13/2417* (2013.01); *H01F 38/14* (2013.01); *H01Q 1/06* (2013.01); *H01Q 1/38* (2013.01); *H04N 5/23203* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2006/0261938 | A1* | 11/2006 | Lai | G06K 7/0008 340/505 |
| 2010/0019882 | A1* | 1/2010 | Stern | G06K 7/0008 340/10.1 |
| 2014/0320261 | A1* | 10/2014 | Davis | G06K 7/10227 340/5.61 |
| 2016/0241999 | A1* | 8/2016 | Chin | H04W 4/021 |

* cited by examiner

*Primary Examiner* — Heather R Jones

(57) ABSTRACT

A combination of a RFID antenna and an illumination device contains: a casing, a lighting unit, and a RFID antenna. The casing includes a metal plate and a fixing frame which has an opening and being mounted on a front end of the metal plate. The lighting unit includes a light guide plate and multiple light emitting elements, wherein the lighting unit is defined between the metal plate and the fixing frame, the light guide plate is fixed between the metal plate and the fixing frame, and the light guide plate has a transporting face facing the opening of the fixing frame so that the lights illuminate to the transporting face of the light guide plate from the multiple light emitting element. The RFID antenna is accommodated in the front end of the metal plate and is defined between the light guide plate and the metal plate.

6 Claims, 6 Drawing Sheets

COMBINATION OF RFID ANTENNA AND ILLUMINATION DEVICE

FIELD OF THE INVENTION

The present invention relates to a combination of a RFID antenna and an illumination device which overlaps a light illumination area of the lighting unit with the reading range of the RFID antenna so that user distinguishes the reading range of the RFID antenna by using the lights illumination area of the lighting unit.

BACKGROUND OF THE INVENTION

A conventional radio frequency identification system contains a tag and a RFID reader, wherein the tag is configured to store data, and the RFID reader transmits radio waves (i.e. electromagnetic waves) so that the tag electromagnetically receives and converts electromagnetic waves into electric currents within a receiving range, and a chip in the tag operates by using the electric current and transmits the data to the RFID reader via the radio identification signals of the tag. Thereafter, the RFID reader reads data in the radio identification signals from the tag and provides the data to an application system so that the data is processed or applied.

The tag is attached on a product, an identification card or a ticket, and the RFID reader is fixed or portable. When an antenna of the RFID reader is fixed on a predetermined position, the radio identification signals of the tag is read after the tag enters into a reading range of the antenna.

The antenna of the RFID reader is applicable for electronic article surveillance (EAS) system in a supermarket or a shopping mall. For instance, the antenna of the RFID reader is mounted on an entrance or a ceiling of the supermarket. However, when the antenna of the RFID reader is mounted on the entrance the supermarket, it is broken easily. When the antenna of the RFID reader is mounted on the ceiling of the supermarket, a reading range is limited because of a height of the ceiling.

The present invention has arisen to mitigate and/or obviate the afore-described disadvantages.

SUMMARY OF THE INVENTION

The primary objective of the present invention is to provide a combination of a RFID antenna and an illumination device which overlaps a light illumination area of the lighting unit with the reading range of the RFID antenna so that user distinguishes the reading range of the RFID antenna by using the lights illumination area of the lighting unit.

Another objective of the present invention is to provide a combination of a RFID antenna and an illumination device which adjustably uses the image taking range of the camera as the lights illumination area of the lighting unit, hence the combination of the second embodiment is applicable for product security, image monitoring, access control systems, and location tracking.

To obtain above-mentioned objectives, a combination of a RFID antenna and an illumination device provided by the present invention contains: a casing, a lighting unit, and a RFID antenna.

The casing includes a metal plate and a fixing frame, the fixing frame has an opening and being mounted on a front end of the metal plate.

The lighting unit includes a light guide plate and multiple light emitting elements arranged on a peripheral side of the light guide plate, wherein the lighting unit is defined between the metal plate and the fixing frame, and the light guide plate is fixed between the metal plate and the fixing frame, wherein the light guide plate has a transporting face facing the opening of the fixing frame so that the lights illuminate to the transporting face of the light guide plate from the multiple light emitting element.

The RFID antenna is accommodated in the front end of the metal plate and is defined between the light guide plate and the metal plate.

Preferably, the PRID antenna corresponds to a central position of the transporting face of the light guide plate.

Preferably, the RFID antenna is a circular polarized antenna.

Preferably, the RFID antenna is a printed antenna.

Preferably, the combination further contains a RFID reader electrically connected with the RFID antenna.

Preferably, the combination further contains a Wi-Fi monitoring unit, and the Wi-Fi monitoring unit includes a camera and a controller in which a wireless communication module is arranged, wherein the controller and the camera are electrically connected with the RFID reader, such that the RFID reader starts the controller after acquiring radio identification signals of a tag by using the RFID antenna, and the controller controls the camera to take images and to send the images to a host/server via the wireless communication module.

DETAILED DESCRIPTION OF THE PREFERRED EMBODIMENTS

Figure 1:
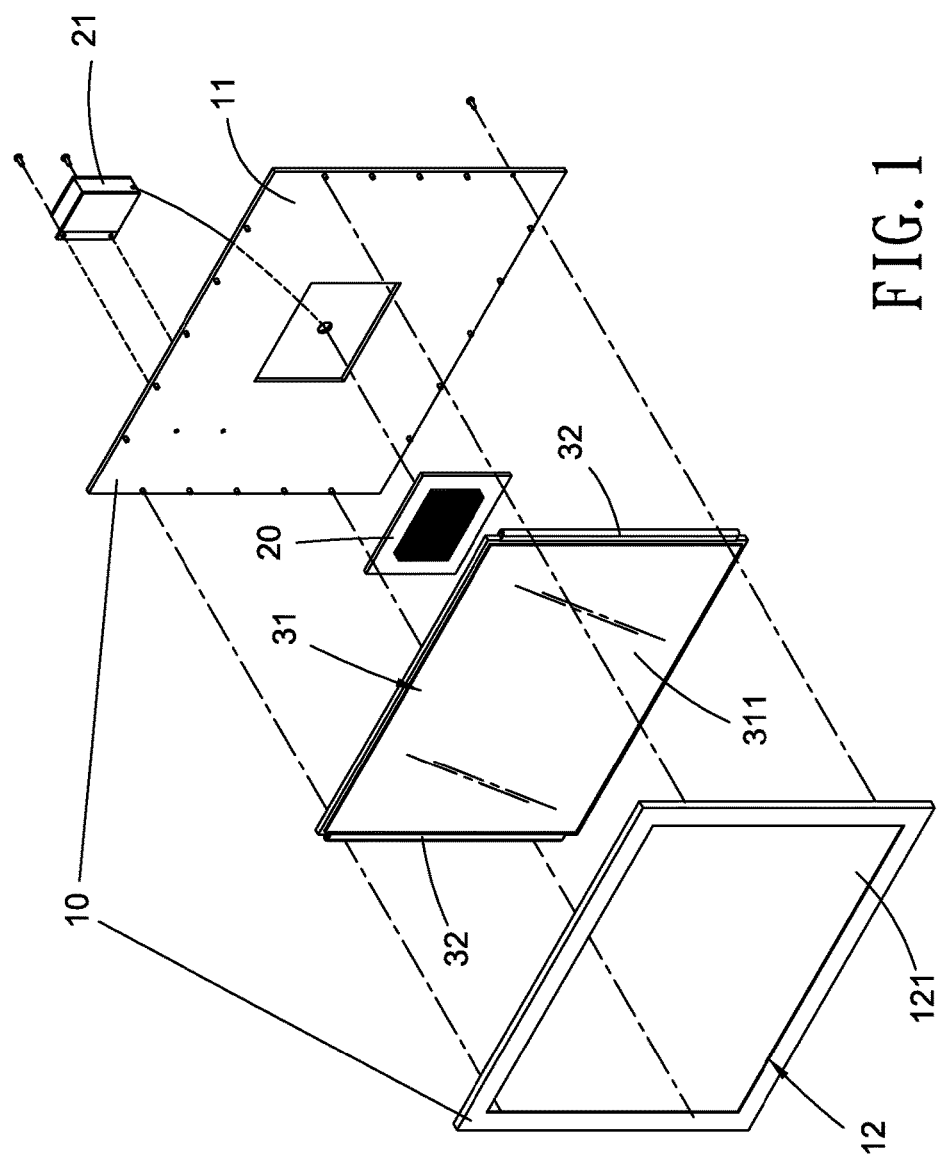
FIG. 1 is a perspective view showing the exploded components of a combination of a RFID antenna and an illumination device according to a first embodiment of the present invention.
Figure 2:
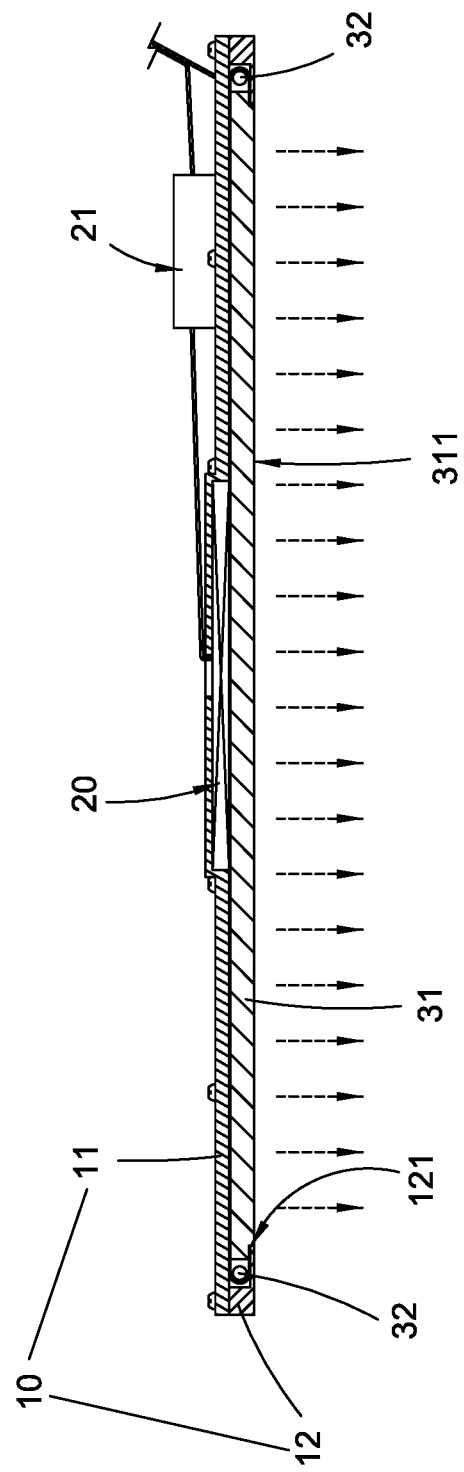
FIG. 2 is a cross sectional view showing the assembly of the combination of the RFID antenna and the illumination device according to the first embodiment of the present invention.

With reference to FIGS. 1 and 2, a combination of a RFID antenna and an illumination device according to a first embodiment of the present invention comprises: a casing 10, a lighting unit, and the RFID antenna 20.

The casing 10 includes a metal plate 11 and a fixing frame 12, wherein the fixing frame 12 has an opening 121 configured to transport lights from the lighting unit, and the fixing frame 12 is mounted on a front end of the metal plate 11. Preferably, the metal plate 11 is made of aluminum.

The lighting unit includes a light guide plate 31 and multiple light emitting elements 32 arranged on a peripheral side of the light guide plate 31, wherein each of the multiple light emitting elements 32 is light-emitting diode (LED) or a LED light tube, the lighting unit is defined between the metal plate 11 and the fixing frame 12, and the light guide plate 31 is fixed between the metal plate 11 and the fixing frame 12, wherein the light guide plate 31 has a transporting face 311 facing the opening 121 of the fixing frame 12 so that the lights illuminate to the transporting face 311 of the light guide plate 31 from each light emitting element 32, and the light guide plate 31 is retained with the opening 121 of the fixing frame 12.

The RFID antenna 20 is accommodated in the front end of the metal plate 11 and is defined between the light guide plate 31 and the metal plate 11, wherein the RFID antenna 20 is a printed antenna.

The metal plate 11, the RFID antenna 20, and the lighting unit are connected tighter, and the metal plate 11 is configured to dissipate heat of a radio device. Preferably, the metal plate 11 has multiple cooling fans and/or a cooling fan which is arranged on a rear end of the metal plate 11 so as to enhance heat dissipation. Furthermore, the metal plate 11 is used as an electromagnetic reflector of the RFID antenna 20 so as to reflect electromagnetic waves of the RFID antenna 20 to the lighting unit. Preferably, the RFID antenna 20 is a circular polarized antenna capable of reducing scattered waves and increasing a reading range of the electromagnetic waves of the RFID antenna 20. Preferably, the PRID antenna 20 corresponds to a central position of the transporting face 311 of the light guide plate 31.

The combination of the RFID antenna and the illumination device of the first embodiment further comprises a RFID reader 21 fixed on the rear end of the metal plate 11, wherein the RFID reader 21 is electrically connected with the RFID antenna 20 so as to read radio identification signals of a tag by way of the RFID antenna 20, and the RFID reader 21 provides data in the radio identification signals to an application system so that the data is processed or applied.

Figure 3:
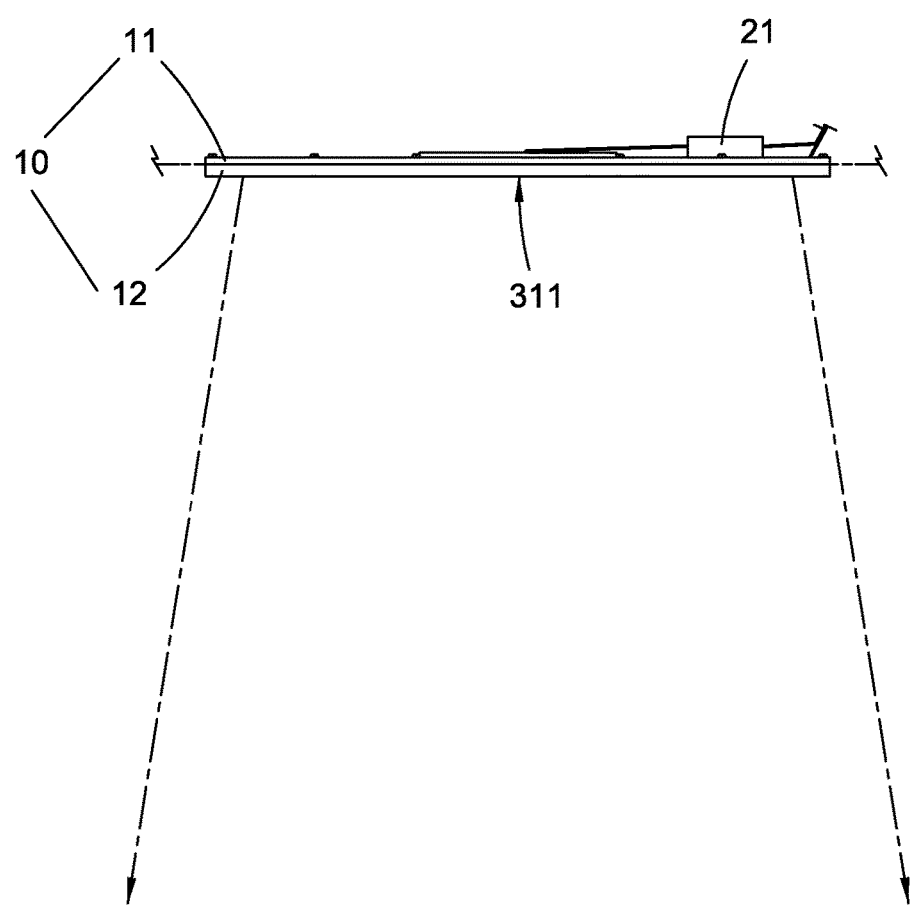
FIG. 3 is a side plan view showing the application of the combination of the RFID antenna and the illumination device according to the first embodiment of the present invention.

Referring to FIG. 3, the combination of the first embodiment is fixed on a ceiling so that the lighting unit illumes the lights downwardly, and the reading range of the RFID antenna 20 is located below the ceiling. Thereby, the lighting unit illumes the lights and indicates the reading range of the RFID antenna 20. In other words, a light illumination area of the lighting unit overlaps with the reading range of the RFID antenna 20 so that user distinguishes the reading range of the RFID antenna 20 by using the lights illumination area of the lighting unit.

Figure 4:
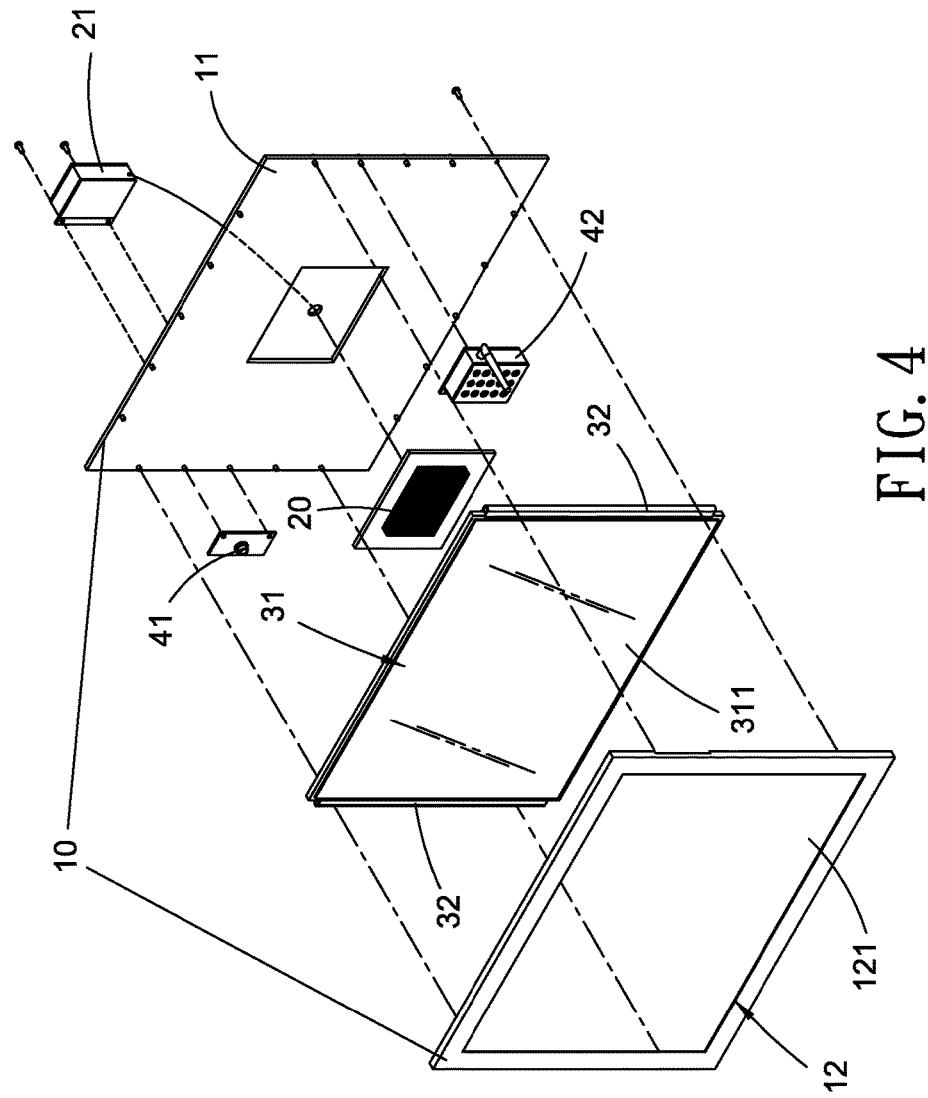
FIG. 4 is a perspective view showing the exploded components of a combination of a RFID antenna and an illumination device according to a second embodiment of the present invention.
Figure 5:
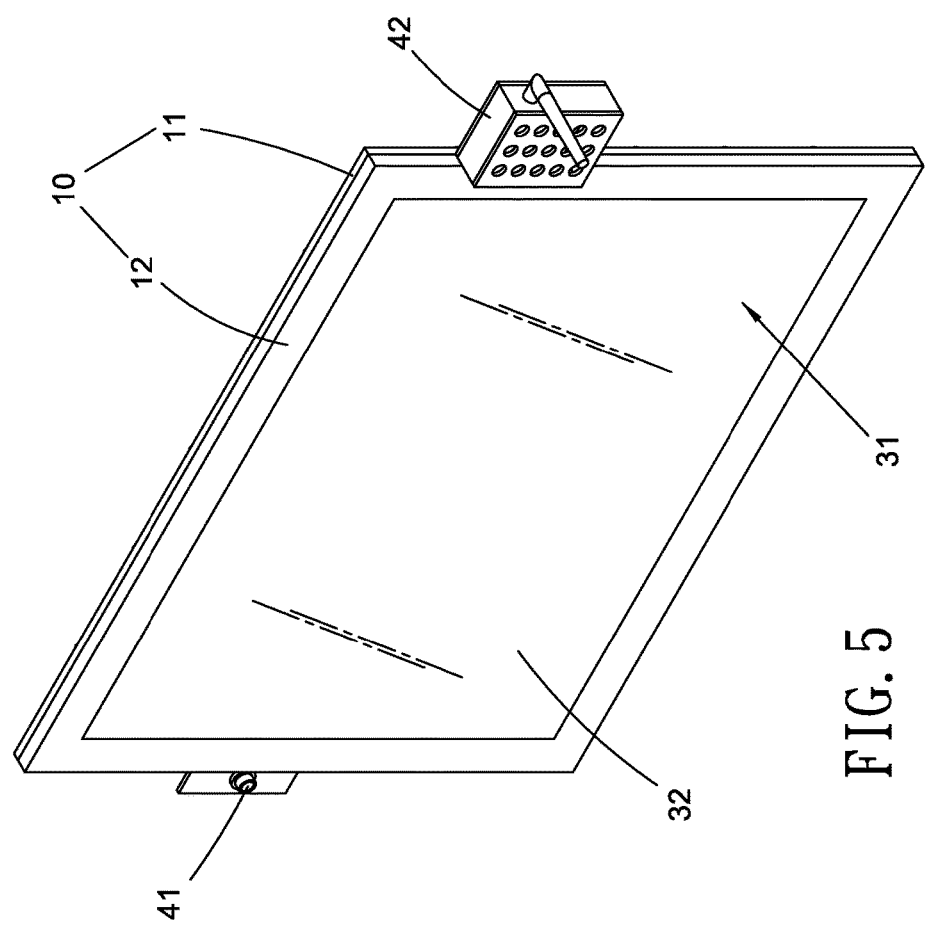
FIG. 5 is a perspective view showing the assembly of the combination of the RFID antenna and the illumination device according to the second embodiment of the present invention.

With reference to FIGS. 4 and 5, a difference of a combination of a RFID antenna and an illumination device of a second embodiment from that of the first embodiment comprises: a Wi-Fi monitoring unit, and the Wi-Fi monitoring unit includes a camera 41 and a controller 42 in which a wireless communication module (not shown) is arranged so as to transmit data via a wireless network, wherein the controller 42 and the camera 41 are electrically connected with the RFID reader 21, such that the RFID reader 21 starts the controller 42 after acquiring the radio identification signals of the tag by using the RFID antenna 20, and the controller 42 controls the camera 41 to take images and to send the images to a host/server via the wireless communication module.

Figure 6:
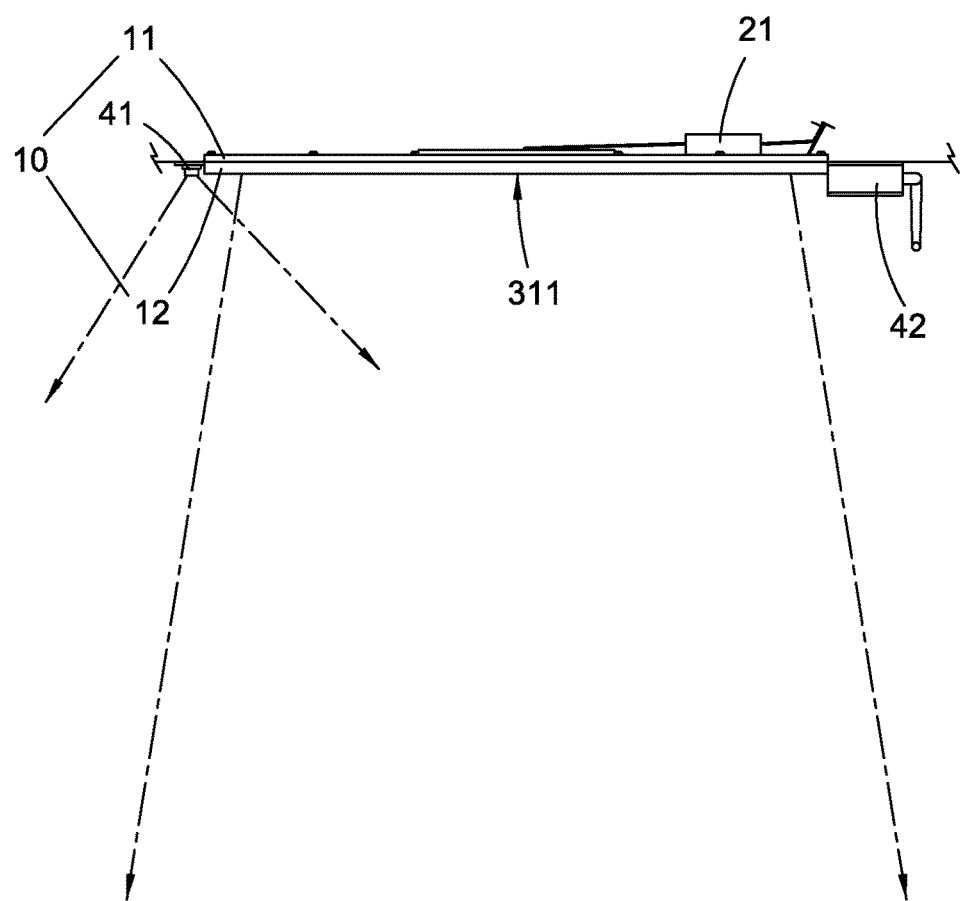
FIG. 6 is a side plan view showing the application of the combination of the RFID antenna and the illumination device according to the second embodiment of the present invention.

Referring to FIG. 6, the camera 41 and the controller 42 are respectively mounted on two sides of the metal plate 11 below the ceiling, and the camera 41 is a mini digital camera, wherein an image taking range of the camera 41 is adjustably used as the lights illumination area of the lighting unit, hence the combination of the second embodiment is applicable for product security, image monitoring, access control systems, and location tracking. For example, the RFID reader 21 starts the controller 42 after acquiring the radio identification signal of the tag by way of the RFID antenna 20 so that the controller 42 controls the camera 41 to take images and to send the images to a host/server via the wireless communication module of the controller 42.

Preferably, power supply and/or wiring of the lighting unit, the RFID reader 21, and the Wi-Fi monitoring unit are integrated together so as to simplify power and signal wirings.

In another embodiment, the RFID reader 21 transmits data via the wireless communication module of the controller 42 so as to eliminate physical wiring construction and configuration.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A combination of a RFID antenna and an illumination device comprising:
    a casing including a metal plate and a fixing frame, the fixing frame having an opening and being mounted on a front end of the metal plate;
    a lighting unit including a light guide plate and multiple light emitting elements arranged on a peripheral side of the light guide plate, wherein the lighting unit is defined between the metal plate and the fixing frame, and the light guide plate is fixed between the metal plate and the fixing frame, wherein the light guide plate has a transporting face facing the opening of the fixing frame so that the lights illuminate to the transporting face of the light guide plate from the multiple light emitting element;
    a RFID antenna accommodated in the front end of the metal plate and is defined between the light guide plate and the metal plate.

2. The combination as claimed in claim 1, wherein the PRID antenna corresponds to a central position of the transporting face of the light guide plate.

3. The combination as claimed in claim 1, wherein the RFID antenna is a circular polarized antenna.

4. The combination as claimed in claim 1, wherein the RFID antenna is a printed antenna.

5. The combination as claimed in claim 1 further comprising a RFID reader electrically connected with the RFID antenna.

6. The electroless plating catalyst as claimed in claim 5 further comprising a Wi-Fi monitoring unit, and the Wi-Fi monitoring unit including a camera and a controller in which a wireless communication module is arranged, wherein the controller and the camera are electrically connected with the RFID reader, such that the RFID reader starts the controller after acquiring radio identification signals of a tag by using the RFID antenna, and the controller controls the camera to take images and to send the images to a host/server via the wireless communication module.

* * * * *